United States Patent [19]
Bruhn, Jr.

[11] 3,786,690
[45] Jan. 22, 1974

[54] LIFT GATE MECHANISM
[75] Inventor: Max R. C. Bruhn, Jr., Spring Lake, Mich.
[73] Assignee: Grand Haven Stamped Products Company, Grand Hills, Mich.
[22] Filed: May 25, 1972
[21] Appl. No.: 256,755

[52] U.S. Cl. .............................................. 74/476
[51] Int. Cl. ............................................ G05g 9/12
[58] Field of Search ...... 74/473 R, 473 P, 475, 476, 74/477

[56] References Cited
UNITED STATES PATENTS
| 3,323,387 | 6/1967 | Hurst, Jr. et al. | 74/476 |
| 3,264,895 | 8/1966 | Turunen | 74/477 |
| 3,306,126 | 2/1967 | Hobbins | 74/473 |
| 3,572,152 | 3/1971 | Bruhn, Jr. et al. | 74/476 |

Primary Examiner—Allan D. Herrmann
Attorney, Agent, or Firm—Peter P. Price et al.

[57] ABSTRACT

A lift gate mechanism for preventing accidental engagement of the reverse gear in a gear-shifting apparatus in which the shifting stick when moved vertically allows shifting of the reverse gear. The shifting stick is pivotal about an axis which is guided along on arcuate cam means for providing the proper amount of restraint against moving the stick vertically into reverse gear actuating position, but facilitating ease in shifting into reverse gear when desired.

12 Claims, 6 Drawing Figures

LIFT GATE MECHANISM

BACKGROUND OF THE INVENTION

This invention relates generally to gear shift mechanisms in which a selector mounted within a housing is adapted to operate and engage forward and reverse gear actuating members by means of an extending arm member. More particularly, the invention relates to a lift gate mechanism associated with the selector and the arm member to prevent accidental engagement of reverse gear. The lift gate mechanism includes a stop abutment means adjacent the reverse gear actuating member which prevents engagement of the reverse actuator under normal operating conditions. A slight upward force on the selector, however, causes the selector arm to lift out of stop abutment position and to engage the reverse gear actuator member.

Various types of manual gear-shifting mechanisms are disclosed, for example, in the Hurst, Jr. et al. U.S. Pat. No. 3,323,387, and in the Bruhn, Jr. et al. U.S. Pat. No. 3,572,152. In these and in similar mechanisms, to prevent accidental or inadvertent engagement of the reverse gear actuator, special lock out mechanisms are provided. Each of the above-mentioned prior patents rely on a biasing means to normally bias the selector away from the reverse gear actuating position. To shift into the reverse gear, a force substantially greater than the normal gear-shifting force is required to override the bias. In this type of gear-shifting mechanism, reverse gear is sometimes difficult to engage.

McQueen, U.S. Pat. No. 3,213,705, discloses a gear shift mechanism having pivotally mounted actuator members adapted for engagement by a selector member. The lock out mechanism provided therein is in the form of a gate which blocks movement of the selector into reverse gear actuating position. The gate is overcome by the application of a straight line vertical upward force on the gear-shifting stick causing the engaging means to lift over the gate. The straight line vertical upward movement is difficult to accomplish since an upward force must be applied and held simultaneously with the rotational movement of the selector into gear-engaging position and then into gear-actuating position. The simultaneous movements and the application of the upward force cause difficulty to women and drivers of small stature.

Other shifting units well known to those skilled in the art sometimes employ a separate actuator on the shifting stick which is mechanically connected to lock out mechanisms which must be shifted out of position prior to engagement of reverse gear.

SUMMARY OF THE INVENTION

The present invention provides a gear-shifting mechanism which does not suffer from the above-outlined disadvantages of the prior art. The shifting mechanism is compact in size and relatively simple in its construction. The invention provides a novel lock out mechanism for preventing accidental engagement of the reverse gear actuator as the mechanism is shifted and in its most important aspect provides a novel cam mechanism for overcoming the lock out mechanism.

Accordingly, it is a primary object of the present invention to provide a novel lift-gate mechanism for preventing inadvertent engagement of the reverse gear actuating member in a gear-shifting mechanism.

It is a further object of the present invention to provide a lift-gate mechanism which not only prevents inadvertent engagement of the reverse gear actuator member but which by a slight pressure upwardly thereon causes it to lift out of stop abutment position into a position so as to engage the reverse gear actuator.

It is yet another object of this invention to provide a selector and gear-actuator members which are uniquely self-contained within a housing.

These and other important aspects, objects, and the many advantages of this invention will become apparent to one skilled in the art from a study of this disclosure, the drawings, and the appended claims.

According to this invention, in a gear-shifting apparatus having a plurality of gear-actuating members arranged for movement in a housing, there is provided a selector having engaging means mounted thereon for selective engagement with one of the plurality of actuating members. The selector is mounted for pivotal movement to effect movement of a selected one of the actuating members. A gate means is associated with the reverse gear actuator member to prevent inadvertent engagement by the engaging means. The engaging means is mounted for curvilinear vertical movement with respect to the selector to thereby allow shifting of the engaging means about the gate means and into selective engagement with the reverse gear actuator.

BRIEF DESCRIPTION OF THE DRAWINGS

The invention will now be described with reference to the accompanying drawings in which.

DESCRIPTION OF THE PREFERRED EMBODIMENT

Figure 1:
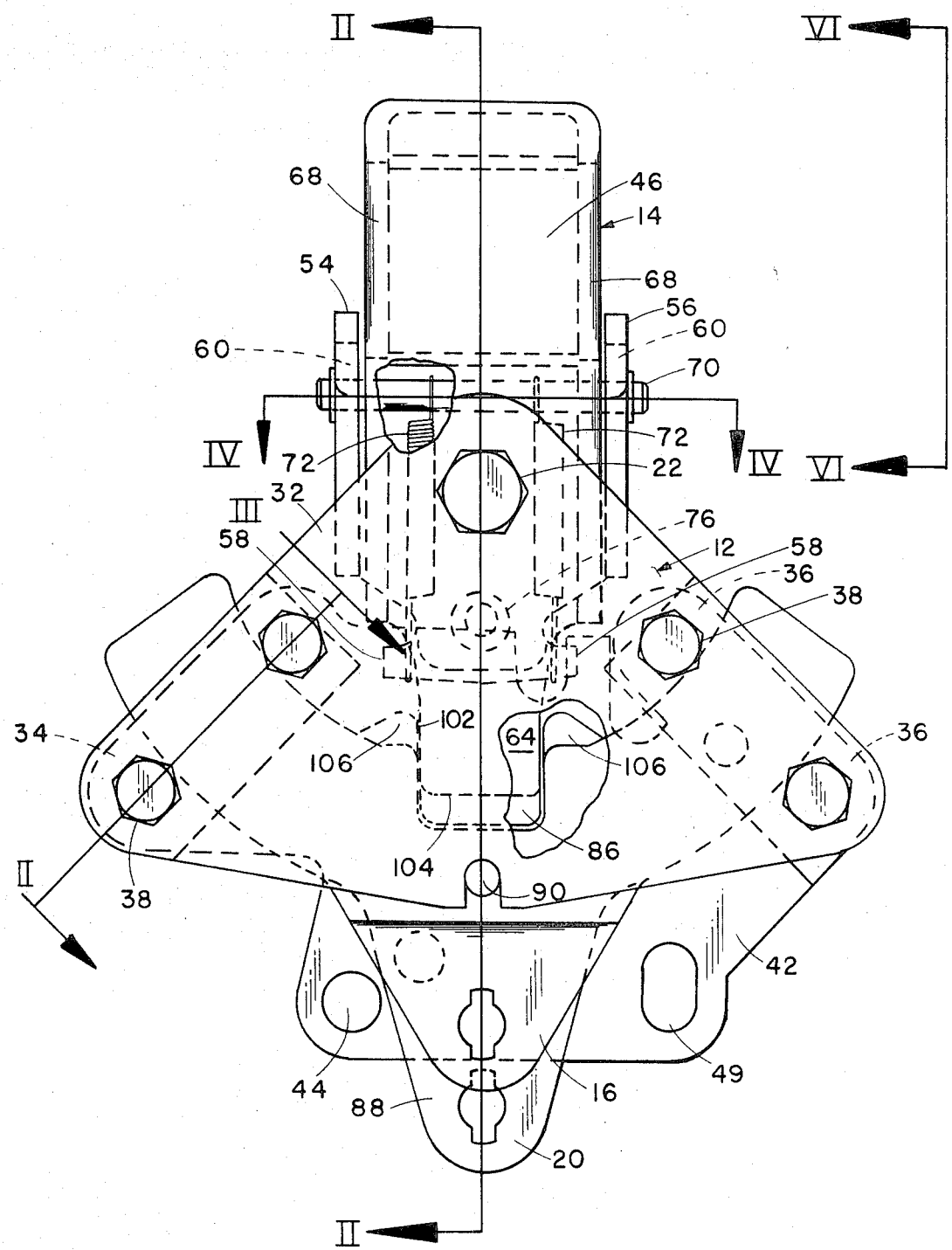
FIG. 1 is an elevational view of a novel four-spaced gear shift mechanism according to the invention.
Figure 2:
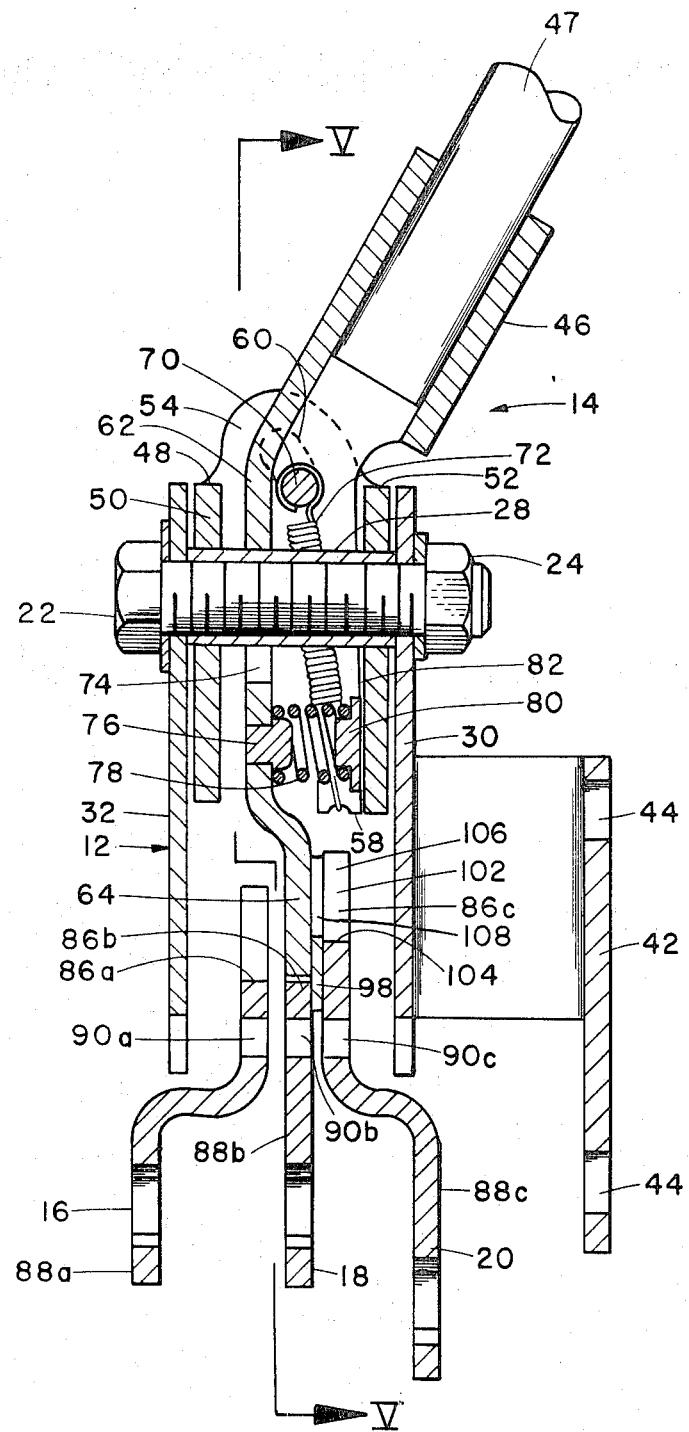
FIG. 2 is a cross-sectional view of the gear shift mechanism taken along the plane II—II of FIG. 1.

Referring now to the drawings, and in particular to FIGS. 1 and 2, the gear shift assembly includes a housing 12, a selector mechanism 14 and a plurality of gear-actuating members 16, 18, and 20 including a first-second gear actuating member 16, a third and fourth gear-actuating member 18 and a reverse gear actuating member 20, all slidably mounted in the housing 12 and each having an outwardly extending flange portion from the bottom of the housing for connection to gear actuating levers (not shown).

A bolt 22 extends between the sides of the housing at an upper portion and is retained therein by a nut 24. The bolt 22 forms a pivot shaft upon which the selector mechanism 14 is rotatably supported on a bushing 28 as will be more fully described hereinafter. The housing 12 includes a pair of triangular-shaped side walls 30 and 32. The side walls are held in a spaced-apart position by means of the bushing 28 in the upper portion thereof and by a pair of spacer and guide assemblies 34 and 36 (FIG. 3) positioned in the lower corners of the triangular shaped side walls. A plurality of bolts 38 passing through the side walls and guide members 34 and 36 are fastened by nuts 40 to hold the side walls 30 and 32 together.

A mounting flange 42 is fixed to side wall 30 by means of the nuts and bolts 38 and 40 and extends a slight distance outwardly from the side of the housing. Openings 44 are provided in a side of the flange 42 for mounting the shifting mechanism within an automobile by bolts or the like to the transmission housing case (not shown).

The selector assembly 14 is mounted for movement about bushing 28 and includes a socket portion 46 adapted to receive a shifting stick 47. Preferably, a gear shift coupling mechanism of the type disclosed in commonly assigned application Ser. No. 24,702 now U.S. Pat. No. 3,657,943 entitled GEAR SHIFT COUPLING MECHANISM is utilized to attach the shifting stick to the selector 14.

Figure 4:
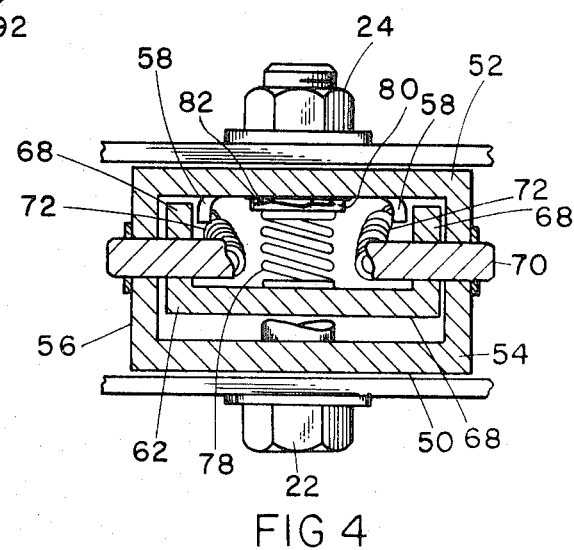
FIG. 4 is a cross-sectional view of the selector taken along the plane IV—IV of FIG. 1.
Figure 6:
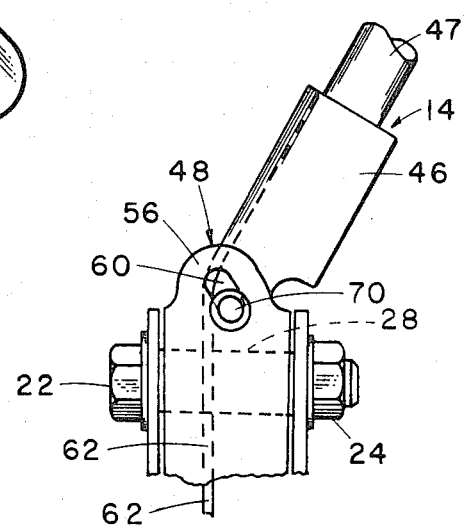
FIG. 6 is a partial side elevational view of the gear shift mechanism as viewed along the plane VI-VI of FIG. 1.

The selector mechanism 14 includes two relatively movable parts, the previously described socket 46 and a carrier member 48. Referring additionally to FIGS. 4 and 6, the carrier member 48 generally is in the shape of a rectangular box opened at the upper and lower ends. The carrier member includes a pair of side walls 50 and 52 and end walls 54 and 56. An opening in the side walls 50 and 52 is provided for mounting the socket for rotation on the bushing 28. The side wall 52 extends downwardly below the level of the end walls and side wall 50 where it terminates in a pair of inwardly directed flanges 58 (FIGS. 2 and 4). The end walls 54 and 56 extend upwardly a slight distance above the side walls 50 and 52 and are provided with aligned, elongated arcuate slots 60. The arcuate slots at their lowermost portion are formed generally centrally in the end walls 54 and 56 and curve upwardly and outwardly with respect to side wall 54 toward side wall 52.

Figure 5:
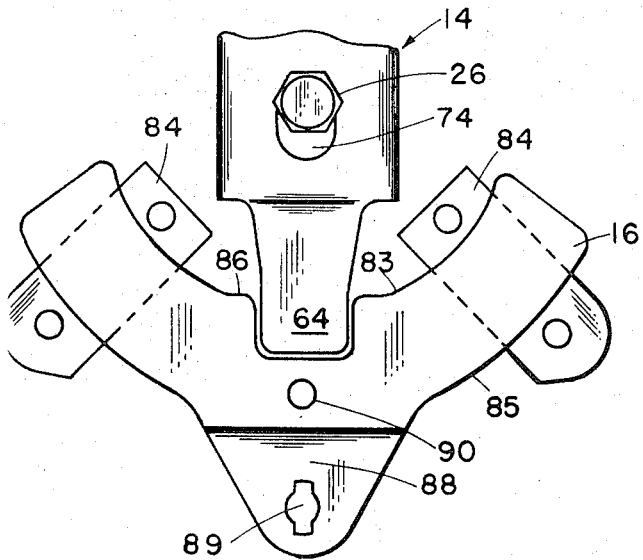
FIG. 5 is a cross-sectional view taken along the plane V—V of FIG. 2 illustrating in somewhat schematic form the interengagement between the selector and one of the actuator members.

The socket portion 46 includes a downwardly extending U-shaped leg portion 62 which tapers inwardly at its lower extremity within the housing 12 to form an actuator engaging arm 64 (FIGS. 2 and 5).

The sides 68 of the U-shaped leg portion each have aligned openings therein for mounting of socket assembly 46 on a shaft 70. Shaft 70 passes through arcuate slots 60 formed in end walls 54 and 56 of the carrier 48 to fix the socket assembly for movement about an axis defined by the shaft 70. Socket 46 is both rotatable about shaft 70 and is shiftable along a curvilinear path with the shaft 70 in the arcuate elongated slots 60 as will be more fully described hereinafter. An elongated opening 74 in leg 62 of socket 46 is provided to allow passage of the shaft and bushing 28 therethrough and to allow shifting of socket 46 and shaft 70 in arcuate slots 60 with respect to the shaft and bushing 28. A pair of tension springs 72 are each connected at one of their ends to shaft 70 and at their opposite ends to flanges 58 formed on side walls 52 of the carrier 48. The springs 72 bias the shaft 70 and selector 14 mounted thereon into the lower extremity of arcuate slots 60. Normally, shaft 70 and socket 46 which is pivoted thereabout, is held by springs 72 in the lower portion of the curved slots 60 for normal forward gear engagement. To effect shifting into reverse gear, the stick and selector assembly is simply lifted upwardly causing shaft 70 and selector assembly 14 to shift upwardly and outwardly as the shaft follows the contour of curved arcuate slot 60. As the shaft and selector move upwardly and outwardly, the portion of leg 62 adjacent shaft 70 moves toward wall 50. Simultaneously, arm 64 lifts above gate 98 and is pivoted about shaft 70 into notch 86c in the reverse gear-actuator member. A very slight lifting force is required and as the shaft 70 follows the arcuate slots or cam 70, a pivoting action of the socket assembly occurs to simultaneously lift the arm 64 over the gate and into engagement with reverse gear actuator 20.

A selector arm biasing spring 78 is positioned between the side walls 52 of the carrier 48 and the leg 62 to bias leg 62 and arm 64 toward the opposite side wall 50. The bias spring is retained in position by a raised flange 76 on leg 62 on which the bias spring seats. The opposite side of the spring is seated on a button 80 and is essentially free to slide along a thin, smooth mounting plate 82 positioned between the button and the side wall 52. Preferably, button 80 is made of a lubricious material, as for example, Teflon or Nylon, to prevent wear and to allow sliding movement of the button on plate 82.

Figure 3:
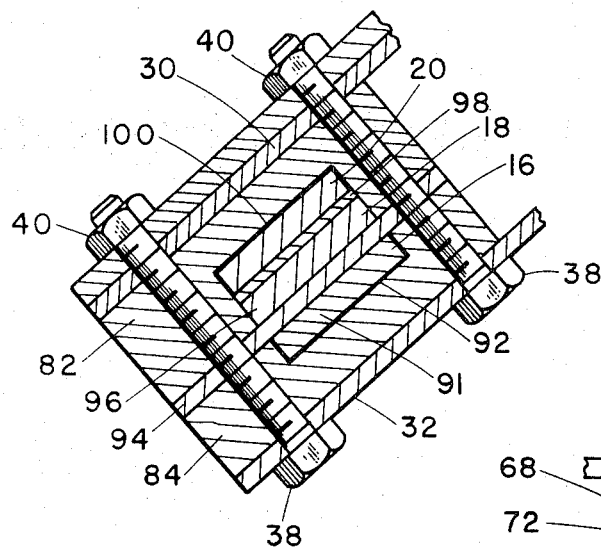
FIG. 3 is a fragmentary cross-sectional view taken along the plane III—III of FIG. 1.

The actuator members 16, 18, and 20 are essentially identical in construction and are slidably received and movable along the length of the housing through the guide members 34 and 36. The actuator members are slidably mounted in the guide assemblies at each end of the housing. The guides are preferably formed of a hardened plastic-like material, i.e., melamine. As illustrated in FIG. 3, the guides are formed of a pair of facing channel members 82 and 84 each having a channel therein adapted to slidably receive the actuator members. In the preferred embodiment, the actuator members are arcuately shaped having a radius of curvature generally defined from the center of the pivot shaft 26. The actuators are movable in the guides 34 and 36 in an arc about the shaft 26 as will be more fully described hereinafter.

In FIG. 5, actuator 16 is illustrated in detail. The remaining actuators 18 and 20 are essentially similar in construction except for significant differences which will be pointed out as the description progresses. Since the actuators are similar, they will not individually be described in great detail. Similar parts are indicated by similar reference numerals with the suffix letter $a$, $b$, or $c$ utilized to designate such similar structure.

Actuator 16 is mounted in a pair of channel members 82 positioned at either side of the housing. As previously mentioned, the actuators are arcuately shaped and have an inner curvilinear surface 83 and an outer curvilinear surface 85. A notch or slot 86 extending downwardly from the inner curvilinear surface 83 is provided for engagement with the selector engaging member 64 of selector assembly 14. A flange 88 extending downwardly from the outer curvilinear surface 84 outside the housing is provided with suitable openings 89 for connection to gear shifting linkages operatively connected to the transmission (not shown). A hole 90 in the face of each of the actuators below the notch is an substantial alignment with the openings in the flange. Similar openings are provided in each of the actuator members and in the side walls 30 and 32 (see FIGS. 1 and 3) to accommodate an alignment pin (not shown) for adjustment of the various gear-shifting linkage mechanisms when the shifter assembly is installed in a vehicle.

Referring also to FIG. 3, the spacer and guide members 34 and 36 which hold the side walls 30 and 32 apart also provide a sliding bearing surface for the actuators. The three actuators are generally centrally located within the guides in a curvilinear slot or recess formed therein. A first or lower guide 84 (shown also in FIG. 5) has a recess 90 provided therein having a depth and width just slightly larger than the thickness and width of the actuator 16. The actuator slides in the recess and a metallic wear plate 92 is provided to prevent excessive wear of the guide. A spacer 94 is positioned over the guide 84 and actuator 16 and a second guide 82 having a similar recess 96 therein is provided over the spacer 94. Reverse gear actuator 20 and third-fourth gear actuator 18 are positioned within recess 96. Gate mechanism 98 is positioned between the actuators 18 and 20. A second metallic wear plate 100 lines the walls of recess 96 to prevent excessive wear on the guide member.

Referring again to FIG. 2, flange members 88 extending from the outer curvilinear surface of each actuator are each formed with respect to the actuator at a slightly different angle to accommodate the shifting linkage mechanisms. The flange 88a on actuator 16 is bent outwardly toward side wall 32 while flange 88c on actuator 20 is bent outwardly toward side wall 30. Flange 88b on actutor 16 extends downwardly in parallel alignment with the side walls of the actuator.

Notches 86 in actuator members 16 and 18 (actuating forward gears first through fourth) are substantially of the same depth so that actuator engaging arm 64 freely passes between slots 86a and 86b depending upon the gear to be engaged. Notch 84c formed in reverse gear actuator 20 includes side walls 102 (FIGS. 1 and 2) and a bottom wall 104. A pair of upstanding side wall extensions or ears 106 extend slightly above the inner curvilinear surface. Gate mechanism 98 positioned between actuators 18 and 20 is provided with a similarly configured notch 108. Gate 98 is not slidable within the guide members but rather is fixed in position with respect thereto such that notch 108 therein is in alignment with notches 86 formed in the actuators. When notches 86a, 86b, and 86c are in alignment with notch 108 in the gate, they cooperatively define a neutral position of the gear shift mechanism.

OPERATION

As will be evident from the foregoing description, the selector 14 is pivotable about two mutually perpendicular axis, i.e., about pivot shaft 26 and also about selector shaft 70. Carrier 48 pivots about shaft 26 to move the entire selector assembly including arm 64 along the length of the housing. Depending upon which notch 86 arm 64 is positioned, it will serve to swing the corresponding actuator in an arc through guide members 84. In FIG. 2, the selector is shown in a neutral position preparatory to shifting third and fourth gear actuator member 18 into a gear engaging position. To shift into the first and second gear actuator 16, the selector is rotated about shaft 70 (FIG. 2) in a clockwise direction against the bias spring 78 causing movement of arm 64 into notch 86a. The selector may then be pivoted about pivot shaft 26 to slide the actuator member 16 in guides 84 into the desired gear engaging position.

Accidental or inadvertent engagement of reverse gear is prevented by the difference in depth of the notch 86b and by the gate 98. Normal movement of the selector in a counterclockwise direction is prevented by the abutment of arm 64 with the side wall of the gate 98. Gate 98 forms a stop abutment to normally prevent entrance of arm 64 into notch 86c in actuator 20. To shift into reverse gear i.e,, to engage actuator 20, the socket assembly is moved vertically upwardly by lifting upwardly on the shifting stick 47 thereby effecting upward movement of the socket portion 14 within the carrier 48. (See also FIG. 6.) The shaft 70 fixed in the socket 46 moves upwardly and outwardly with the socket as shaft 70 follows the contour of the arcuate slots or cams 60 in the end walls 54 and 56 of the carrier 48. The elongated slot 74 (FIG. 5) in the U-shaped portion of the leg of the socket and selector and slot 60 (FIGS. 2 and 6) in the carrier 48 allows the operator to move the socket assembly upwardly with relation to pivot shaft and bushing 28. As the selector 46 is intentionally moved upwardly, the pin 70 follows the contour of the curved slot or cam 60. Simultaneously, the arm 64 is moved upwardly beyond the gate 98 permitting the operator to shift arm 64 through the notch 108 of gate 98 to effect engagement of the arm 64 with the notch 86c in actuator 20. The selector may then be pivoted about the pivot shaft on bushing 28 to effect shifting of the actuator 20 out of the neutral position to thereby engage and shift the reverse gear. Bias springs 72 pulling on shaft 70 exert a constant biasing force thereon so that when the selector is moved back into its netural position, i.e., with slot 86c in alignment with the slot 108 in gate 98, the selector and socket assembly will be pulled downwardly and shaft 70 follows the contour of slots 60 to the lowermost position. At the same time bias spring 78 exerts a force to hold the arm 64 in the neutral position.

The arcuate cam slots in which the selector is mounted for pivotal and vertical movement provide a novel mechanism for preventing inadvertent reverse gear actuation yet assists in shifting into reverse gear when desired. The gate and notch provisions in the reverse gear actuator prevent accidental engagement of reverse gear since such engagement requires a separate and distinct operation on the part of the operator as the selector is pivoted upwardly and outwardly in the arcuate cam slots.

Those skilled in the art will immediately recognize the many important advantages of the present invention. The novel lift-gate mechanism, while positively preventing inadvertent engagement of reverse gear, is readily overcome by the application of an upward force on the shifting stick to thereby cause the selector to move upwardly following the arcuate cam slots thereby allowing the selector arm to be moved into reverse gear actuation position. The upward force as the selector follows the cam slots is a separate and distinct operation on the part of the operator, sufficiently different than the shifting force normally required for forward gear actuation such that the operator will be fully cognizant of his movements to thereby prevent any inadvertent engagement of the reverse gear actuator. The provision of the arcuate cam means provides sufficient restraint against inadverently shifting into reverse gear actuating position; but facilitates ease in shifting into reverse when desired.

While a preferred embodiment of the invention has been illustrated in detail, it will be readily recognized by those skilled in the art that other modifications incorporating the teachings hereof may readily be made

I claim:

1. In a gear-shifting apparatus having a plurality of gear actuator members arranged for movement in a housing, a selector having engaging means mounted on a carrier member for selective engagement with one of said plurality of actuator members, said selector being mounted for pivotal movement to effect movement of a selected one of said actuator members; and gate means associated with one of said actuator members to prevent inadvertent engagement by said engaging means, the improvement comprising:

means supporting said engaging means on said carrier member for generally vertical movement, said supporting means forming a cam follower; and means on said carrier member forming an arcuate cam surface; said cam follower being adapted to follow said arcuate cam surface upon application of upward force on said selector to thereby shift said engaging means about said gate means and into selective engagement with said one of said actuator members.

2. The apparatus as defined in claim 1 and further including biasing means on said engaging means normally biasing said engaging means into a first position out of engagement with said one of said actuator members.

3. The apparatus as defined in claim 2 wherein two arcuate cam surfaces are provided in opposed relationship on opposite sides of said carrier member, said cam follower extending between said cam surfaces and supported therein for movement along said surfaces.

4. The apparatus as defined in claim 3 wherein said cam follower is a shaft extending between said cam surfaces and said engaging means is mounted for rotation on said shaft.

5. The apparatus as defined in claim 4 wherein said carrier member is mounted for pivotal movement about a first axis and said shaft is mounted on said cam surfaces about a second axis transverse to said first axis.

6. The apparatus as defined in claim 1 wherein said cam surface is formed in a generally vertical plane and said cam follower supports said engaging means in a plane generally perpendicular to said cam follower whereby movement of said cam follower along said cam surface effects generally vertical movement of said engaging means with respect to said gate means.

7. The apparatus as defined in claim 1 wherein said plurality of actuator members include forward gear actuators; said one of said actuators is a reverse gear actuator and said actuator cam surface is adapted to provide the proper amount of restraint while permitting ease of shifting to reverse gear if desired.

8. The apparatus as defined in claim 7 and further including:

biasing means on said cam follower and said engaging means to shift same into a non-engaging position with respect to said reverse gear actuator upon cessation of said upward force.

9. The apparatus as defined in claim 7 and further including:

biasing means on said engaging means and said cam follower, said biasing means normally biasing said engaging means into a first position out of engagement with said one of said actuator members.

10. A gear-shifting apparatus comprising:

a plurality of gear actuator members arranged for movement in a housing;

a selector having engaging means mounted on a carrier member for selective engagement with one of said plurality of actuator members, said selector being mounted for pivotal movement about a first axis to thereby effect movement of a selected one of said actuator members;

gate means associated with at least one of said actuator members, said gate means forming a stop abutment for said engaging means and normally preventing engagement of said engaging means with said one of said actuator members;

cam and cam follower means mounting said engaging means on said carrier member for movement about an axis transverse to said first axis;

a shaft along said transverse axis forming said cam follower, said cam means being arcuate in shape and formed in said carrier member for supporting said shaft, said engaging means being pivotally mounted on said shaft about said transverse axis for selective engagement with said plurality of actuating members and shiftable along said cam surface upon application of an upward force to thereby allow shifting of said engaging means about said gate means and into selective engagement with said one of said actuator members.

11. A gear shift mechanism comprising:

at least one forward gear actuator;

a reverse gear actuator;

a selector having engaging means mounted on a carrier member for selectively engaging one of said forward gear actuators and said reverse gear actuator, said selector being pivotally mounted about an axis to effect movement of the selected one of said actuators;

gate means associated with said reverse gear actuator to prevent inadvertent engagement by said engaging means;

means mounting said engaging means on said carrier member for movement about an axis transverse to said first-mentioned axis; said mounting means including an arcuate cam surface formed on said carrier member; and cam-follower means on said engaging means, said cam-follower means forming said transverse axis whereby movement of said cam follower along said arcuate cam surface effects a generally vertical and pivotal movement of said engaging means with respect to said gate means and into engagement with said reverse gear actuator.

12. The apparatus as defined in claim 11 wherein said carrier member includes a pair of arcuate-shaped slots formed in the side walls thereof, said slots forming said cam surface; said cam follower comprising a shaft extending between said cam surfaces and wherein said engaging means is mounted on said shaft.

* * * * *

PO-1050
(5/69)

UNITED STATES PATENT OFFICE
CERTIFICATE OF CORRECTION

Patent No. 3,786,690     Dated January 22, 1974

Inventor(s) Max R. C. Bruhn, Jr.

It is certified that error appears in the above-identified patent and that said Letters Patent are hereby corrected as shown below:

"[73] Assignee:
                     " Grand Hills, Mich."

should be --- Grand Haven, Mich. ---

Col. 5, line 33;
      "84c" should be --- 86c ---.

Signed and sealed this 9th day of July 1974.

(SEAL)
Attest:

McCOY M. GIBSON, JR.                     C. MARSHALL DANN
Attesting Officer                         Commissioner of Patents